United States Patent
Del Toro Manjarrez

(10) Patent No.: US 11,679,477 B2
(45) Date of Patent: Jun. 20, 2023

(54) CORE PULLING TOOL

(71) Applicant: Oscar Del Toro Manjarrez, Bonita Springs, FL (US)

(72) Inventor: Oscar Del Toro Manjarrez, Bonita Springs, FL (US)

( * ) Notice: Subject to any disclaimer, the term of this patent is extended or adjusted under 35 U.S.C. 154(b) by 140 days.

(21) Appl. No.: 17/123,838

(22) Filed: Dec. 16, 2020

(65) Prior Publication Data
US 2022/0184785 A1    Jun. 16, 2022

(51) Int. Cl.
*B25B 27/24* (2006.01)
*F16K 51/00* (2006.01)
*B25B 27/02* (2006.01)
*F16K 11/078* (2006.01)

(52) U.S. Cl.
CPC ............ *B25B 27/24* (2013.01); *B25B 27/023* (2013.01); *F16K 51/00* (2013.01); *F16K 11/0782* (2013.01); *Y10T 29/53552* (2015.01); *Y10T 137/6014* (2015.04)

(58) Field of Classification Search
CPC . B25B 27/0028; B25B 27/023; B25B 27/062; B25B 27/24; Y10T 29/53552; Y10T 29/53857; Y10T 29/53878; Y10T 29/53883; Y10T 29/53909; Y10T 29/53987; Y10T 137/6014; F16K 1/00; F16K 51/00; F16K 11/0782
USPC ........................................................ 29/221.6
See application file for complete search history.

(56) References Cited

U.S. PATENT DOCUMENTS

| | | | | |
|---|---|---|---|---|
| 2,649,825 A | * | 8/1953 | Fisher | B25B 13/481 81/125 |
| 2,951,282 A | * | 9/1960 | Albright | B25B 27/023 29/259 |
| 3,592,394 A | | 7/1971 | Sinden | |
| 4,009,515 A | * | 3/1977 | Racin | B25B 27/023 29/280 |
| 5,033,142 A | * | 7/1991 | Templeton | B63C 11/52 224/222 |
| 5,054,179 A | * | 10/1991 | Rini | B25B 27/24 408/101 |
| 5,119,556 A | | 6/1992 | Hseu | |
| 5,519,929 A | * | 5/1996 | Bleckman | B25B 27/023 29/264 |
| 5,669,404 A | | 9/1997 | Guillermo | |
| 5,915,741 A | | 6/1999 | Parker | |
| 6,944,924 B2 | | 9/2005 | Hayes | |
| 7,987,571 B2 | * | 8/2011 | English | B25B 27/24 29/256 |

(Continued)

*Primary Examiner* — Don M Anderson
*Assistant Examiner* — Jason Khalil Hawkins
(74) *Attorney, Agent, or Firm* — Edward M. Livingston; Livingston Law, P.A.

(57) ABSTRACT

A faucet valve cartridge pulling tool comprising a housing, a stem screw, and a collar. The housing has a first end and a second end. The first end has a surface adapted to abut a portion of a faucet valve body. The stem screw has a first end and a second end. The stem screw includes a first threaded section and a second threaded section. The first threaded section is adapted to engage internal threading of a faucet valve cartridge stem located within the faucet valve body. The collar has internal threading engaging the second threaded section of the stem screw. Wherein, rotating the collar relative to the stem screw pulls the first threaded portion axially towards the second end of the housing.

16 Claims, 7 Drawing Sheets

(56) References Cited

U.S. PATENT DOCUMENTS

| | | | |
|---|---|---|---|
| 10,611,007 B2* | 4/2020 | Seamons | B25B 27/023 |
| 10,792,796 B2* | 10/2020 | Wilson | B25B 13/48 |
| 11,338,419 B1* | 5/2022 | Roston | B25B 27/24 |
| 2006/0026811 A1 | 2/2006 | Shultz, Sr. | |
| 2018/0354111 A1 | 12/2018 | Getchell | |

* cited by examiner

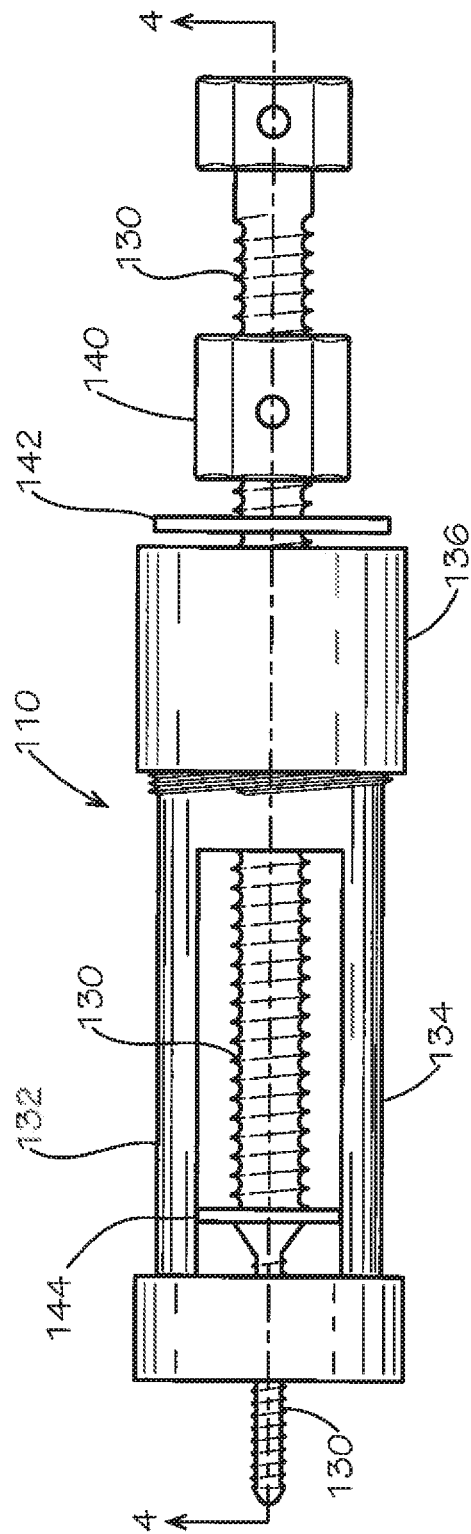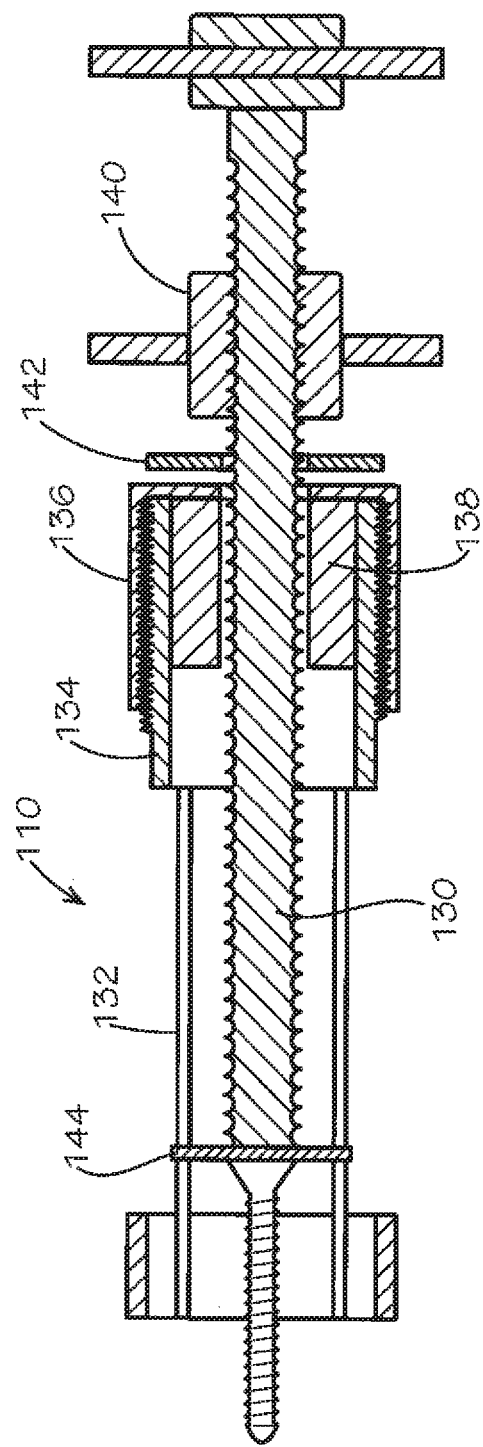
FIG. 3
FIG. 4

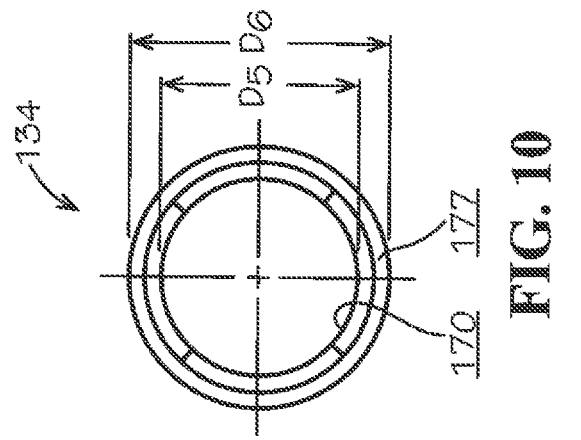
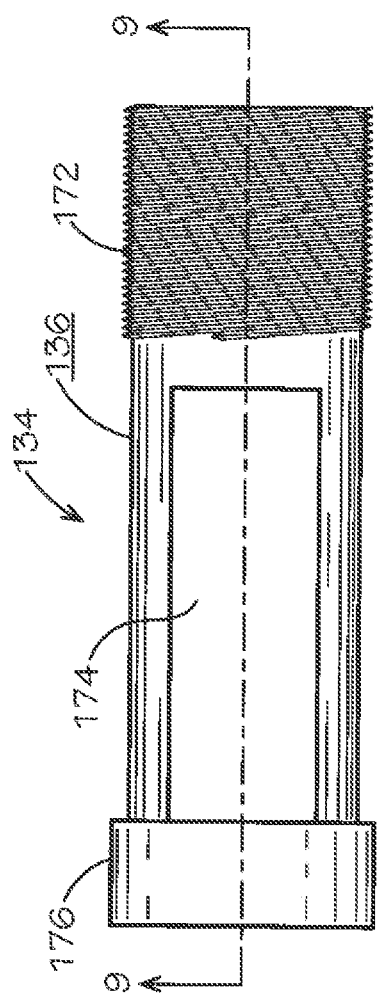
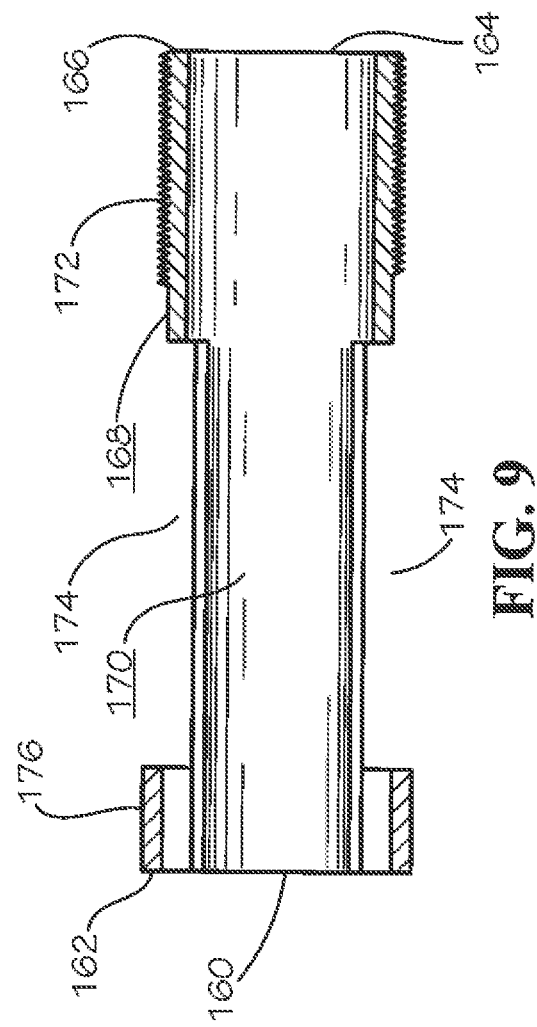

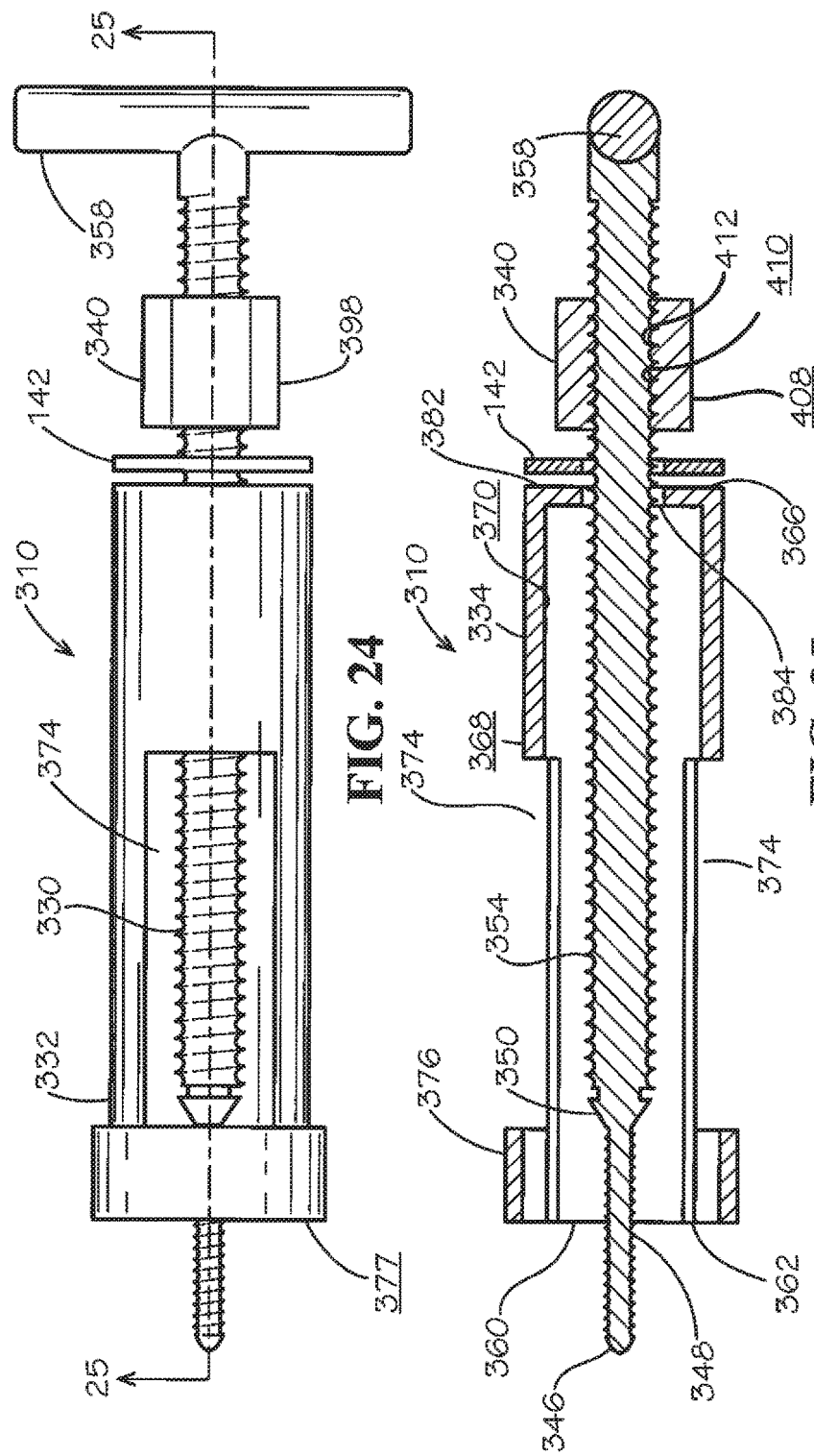
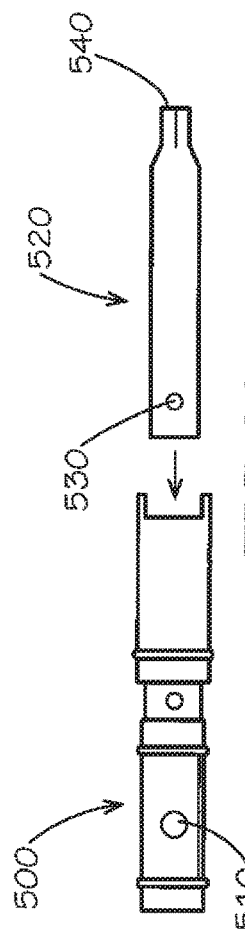

CORE PULLING TOOL

FIELD OF THE INVENTION

This disclosure relates to a cartridge pulling tool for pulling cartridge from a valve. More specifically, this disclosure relates to a cartridge pulling tool for pulling cartridge from a valve of a tub or shower faucet.

BACKGROUND OF THE INVENTION

Cartridges have been used to control the operation of the handle of a tub or shower faucet and the flow and temperature control of the water of the faucet. One such cartridge is sold under the brand name "MOEN." While such cartridges are effective for its purpose, they are prone to failure and may require to be replaced occasionally. In many instances, the cartridge is situated within a tube of the faucet valve body. To access the damaged cartridge for replacement, the faucet handle and any trim pieces may need to be removed along with any clip that retains the cartridge to the tube of the faucet valve body. For some cartridges, they can be easily accessed after the removal of the handle and trim pieces and can be removed simply by hand. However, for other cartridges, they may be situated well within the valve body tube and/or tightly fit within the tube making removal of the cartridges by hand extremely difficult. To remove such cartridges, plyers may be used to grab a hold of the stem of the cartridge and physically pull the cartridge axially for removal. However, such a process requires the user to have a good grip of the stem with the plyer, which may be difficult to do. Even if the user is able to have a good grip with the plyer, to pull the cartridge out the tube, the user may wiggle and/or twist the cartridge in such a way that the removal process damages the cartridge or the valve body tube. For example, due to the cartridge not being pulled axially, the cartridge may scrap and damage the inner surface of the valve body tube, which then requires a more time consuming and costly repair to replace the valve body. Furthermore, the wiggling and/or twisting motion of the cartridge may break off a portion of the cartridge, including but not limited to the seal or plastic housing, which if not completely removed prior to installation of the new cartridge, may contaminate the valve body and/or the new cartridge.

Cartridge pulling tools are available in the market to pull and remove the damaged cartridge. Such prior art cartridge pulling tool 10, as illustrated in FIG. 1, includes a threaded stem screw 12 extending axially through the tool body 14 of the pulling tool, a nut 16 with internal threading engaging the corresponding threading 18 defined on the stem screw 12, and a T shaped handle 20 attached to the tool body. To remove the damaged cartridge, the stem screw 12 of the cartridge pulling tool 10 is screwed into the stem of the damage cartridge. The nut 16 of pulling tool is turned until it is snug against the valve body tube. Once the cartridge pulling tool 10 is secured to the cartridge stem and the tool is snug against the valve body tube, the user grips the T shaped handle 20 and pull firmly straight outward in the axial direction of the cartridge to remove the cartridge. While the prior art cartridge pulling tool allows the user to more securely grab a hold of the damaged cartridge than a pair of plyers, the prior art cartridge pulling tool still requires the user to attempt to physically pull the cartridge straight outward in the axial direction. However, such a process may not always be followed or even possible. Therefore, when using the prior art tool, the user may still pull the cartridge to the side or off angle, causing damage to the valve body tube or the cartridge.

SUMMARY OF THE INVENTION

It is to be understood that this summary is not an extensive overview of the disclosure. This summary is exemplary and not restrictive, and it is intended neither to identify key or critical elements of the disclosure nor delineate the scope thereof. The sole purpose of this summary is to explain and exemplify certain concepts of the disclosure as an introduction to the following complete and extensive detailed description.

Disclosed is a faucet valve cartridge pulling tool comprising a housing, a stem screw, and a collar. The housing has a first end and a second end. The first end has a surface adapted to abut a portion of a faucet valve body. The stem screw has a first end and a second end. The stem screw includes a first threaded section and a second threaded section. The first threaded section is adapted to engage internal threading of a faucet valve cartridge stem located within the faucet valve body. The collar has internal threading engaging the second threaded section of the stem screw. Wherein, rotating the collar relative to the stem screw pulls the first threaded portion axially towards the second end of the housing.

Also disclosed is a method for pulling a faucet valve cartridge comprising the steps of: providing a housing having a first end and a second end, the first end has a surface, providing a stem screw having a first end a second end, the stem screw includes a first threaded section and a second threaded section, providing a collar having internal threading engaging the second threaded section of the stem screw, positioning the first end of stem screw in an opening of a cartridge stem located within a faucet valve body tube having a surface, rotating the stem screw to insert the first threaded section of the stem screw within the cartridge stem, positioning the surface of the housing in abutting relationship with the surface of the faucet valve body tube, and rotating the collar relative to the stem screw to pull the cartridge stem towards the second end of the housing.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

FIG. 3 is a side view the cartridge pulling tool illustrated in FIG. 2.

FIG. 4 is a cross-sectional view of the cartridge pulling tool along line 4-4 as shown in FIG. 3.

FIG. 8 is a side view of the tubular body illustrated in FIG. 4.

FIG. 9 is a cross-sectional view of the tubular body along line 9-9 as shown in FIG. 8.

FIG. 10 is a bottom view of the tubular body illustrated in FIG. 8.

FIG. 24 is a side view of a cartridge pulling tool in accordance with a second aspect of the present disclosure.

FIG. 25 is a cross-sectional view of the cartridge pulling tool along line 25-25 as shown in FIG. 24.

FIG. 26 is a top view of a Moen 1200 cartridge sleeve and a special puller extension for removing same.

DETAILED DESCRIPTION OF THE PREFERRED EMBODIMENTS

Figure 1:
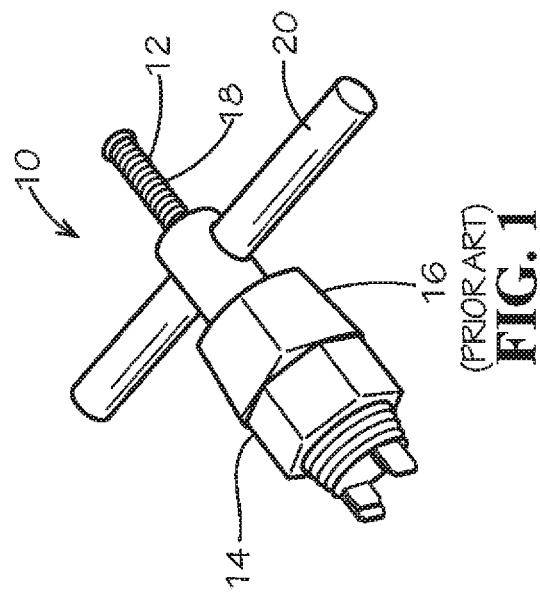
FIG. 1 is a perspective view of a prior art cartridge pulling tool.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise. Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about W, L, D or substantially W, L, D on a particular measurement scale measures within a range between W, L, D plus an industry-standard upper tolerance for the specified measurement and W, L, D minus an industry-standard lower tolerance for the specified measurement.

Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word or as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed is a cartridge pulling tool and associated methods, systems, devices, and various apparatus. It would be understood by one of skill in the art that the disclosed cartridge pulling tool is described in but a few exemplary aspects among many. No particular terminology or description should be considered limiting on the disclosure or the scope of any claims issuing therefrom.

Figure 2:
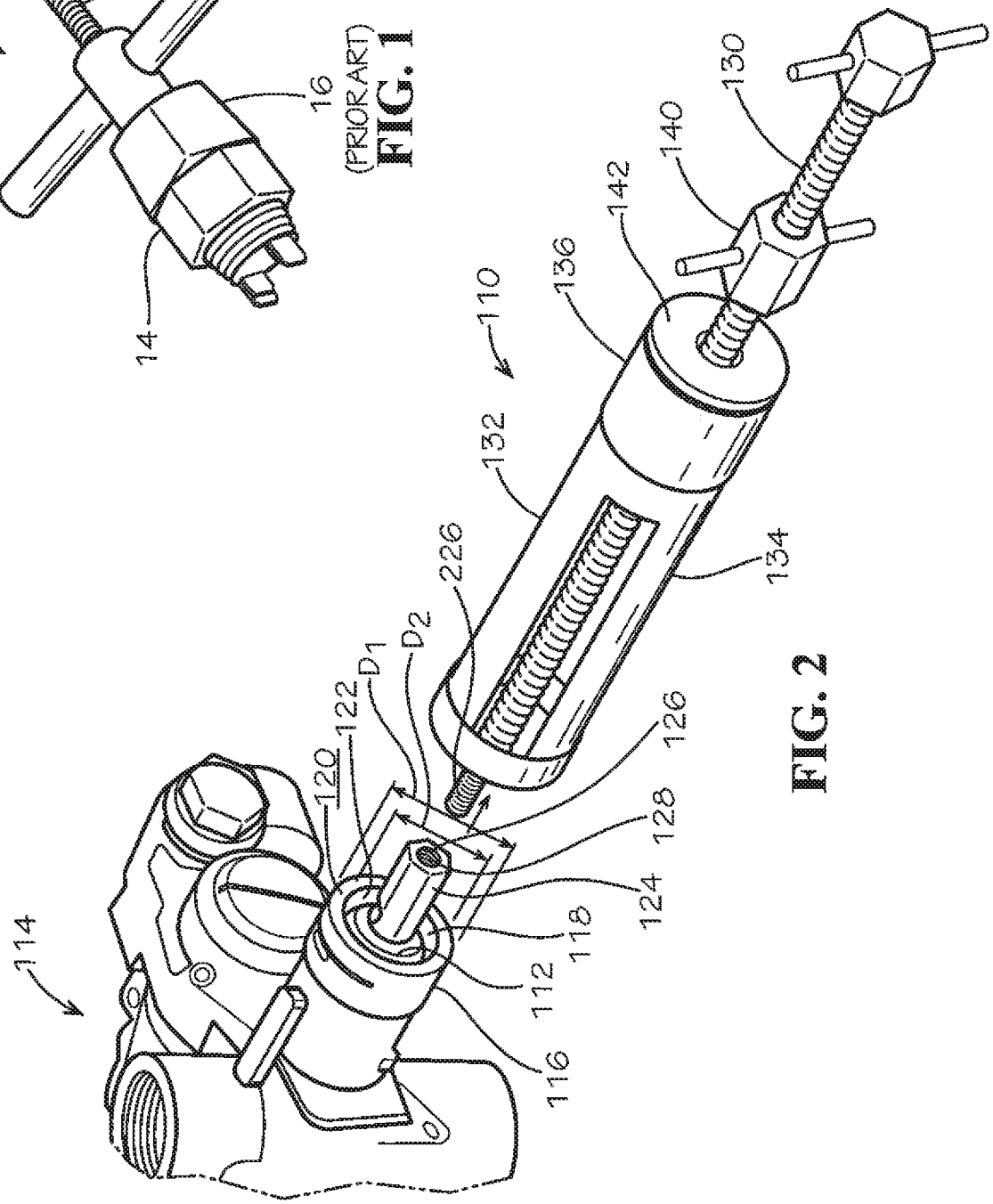
FIG. 2 is a perspective view of a faucet valve body, a cartridge situated in the valve body tube and a cartridge pulling tool in accordance with a first aspect of the present disclosure.

A first aspect of a cartridge pulling tool 110 is disclosed and described in FIGS. 2-23. FIG. 2 illustrates a cartridge pulling tool 110 for pulling a cartridge 112 situated in the tube 116 of a faucet valve body 114. The tube 116 defines an axially extending hollow interior 118 for which the cartridge 112 is situated. The tube 116 also defines an annular surface 120 radially outward of the entrance 122 of the hollow interior 118. The annular surface 120 of the tube has an inner diameter $D_1$ and an outer diameter $D_2$. The cartridge 112 includes an axially extending stem 124. The stem 124 include internal threading 126 defining an axially extending hollow interior 128 radially inward of the threading 126.

As shown in FIGS. 3 and 4, the cartridge pulling tool 110 can comprise a stem screw 130 and a housing 132 that includes a tubular body 134, a cap 136, and a sleeve 138. The cartridge pulling tool 110 can further comprise a collar 140, a washer 142 and a centering flange 144.

Figure 5:
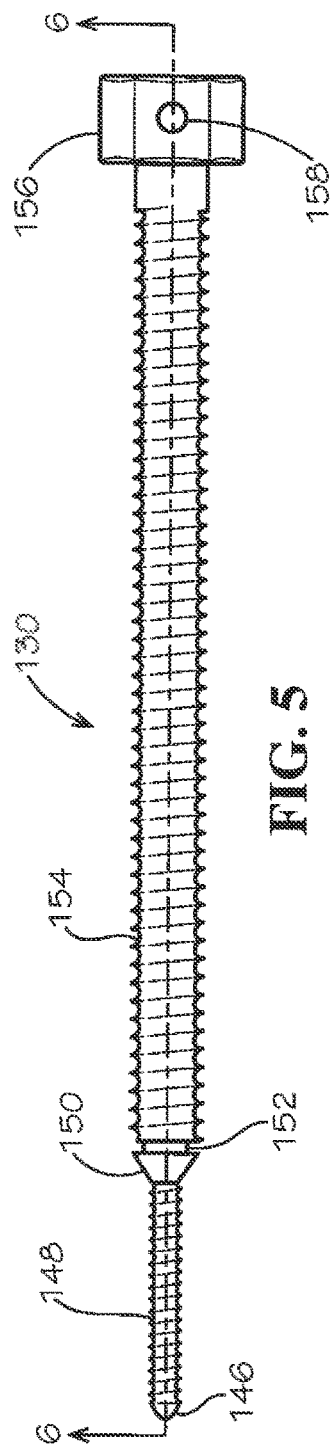
FIG. 5 is a side view of the stem screw illustrated in FIG. 4.
Figure 6:
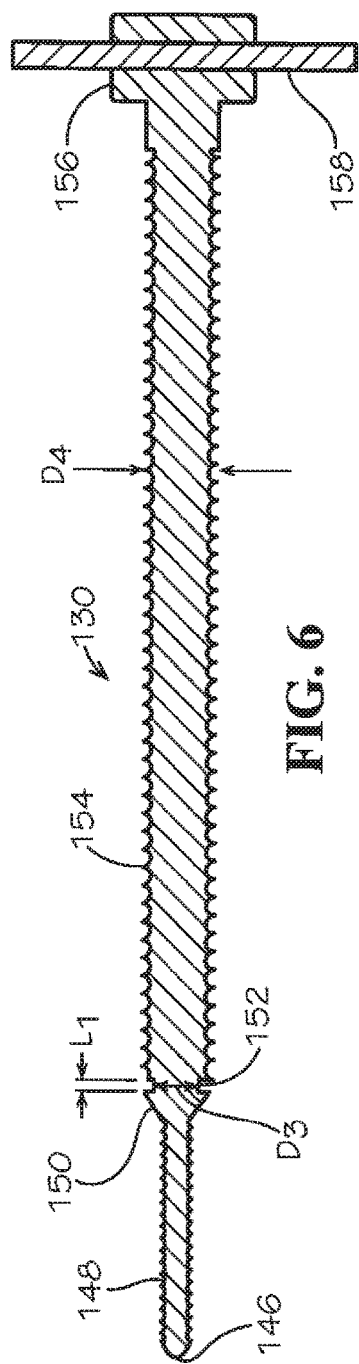
FIG. 6 is a cross-sectional view of the stem screw along line 6-6 as shown in FIG. 5.
Figure 7:
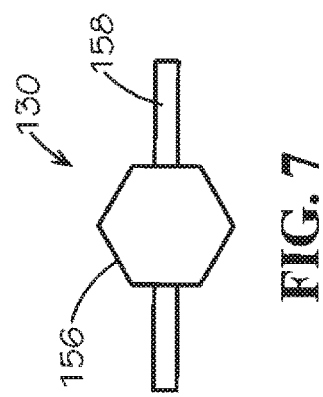
FIG. 7 is a top view of the stem screw illustrated in FIG. 5.

The stem screw 130 is illustrated in FIGS. 5-7. The illustrated stem screw 130 can be formed of a high strength metallic material or high strength non-metallic materials such as high strength plastic. The stem screw 130 includes a rounded or tapered end 146, a first threaded section 148, a conical section 150, a groove 152, a second threaded section 154, and a hexagon (or nut) shaped expansion 156 at the other end of the stem screw with a handle 158 extending perpendicularly or radially from the expansion 156. The first threaded section 148 of the stem screw has major, minor and pitch diameters and thread count to match the corresponding diameters and thread count of the internal threading 126 of the cartridge stem 124 such that the first threaded section 148 of the stem screw 130 is able to engage and be securely attached to the cartridge stem 124. The rounded or tapered end 146 of the stem screw 130 assists in guiding the first threaded section 148 of the stem screw 130 into the hollow interior 126 of the cartridge stem 124. The conical section 150 of the stem screw transitions the stem screw from the first threaded section 148 to the second threaded section 154. The conical section 150 can also act as a stop to prevent further axial insertion of the stem screw 130 into the cartridge stem 124. A groove 152 can be defined on the outer surface of the stem screw 130. The groove 152 has a diameter $D_3$ and an axial length $L_1$. The groove 152 is illustrated in FIGS. 5 and 6 as being adjacent to the conical section 150; however, the groove 152 can alternatively be defined at a distance from the conical section 150. The groove 152 is sized to accommodate the centering annular flange 144. The second threaded section 154 extends axially from the groove 152 to the expansion 156. The second threaded section 154 has a major diameter $D_4$. The expansion 156 can be hexagon or nut shaped as illustrated in FIG. 7. The expansion 156 can be formed with the second threaded section 154 or the expansion 156 can be formed separately and then attached to the second threaded section 154, such as by welding. A handle 158 extends perpendicularly or radially from the expansion 158. FIG. 6 illustrates the expansion 156 defines a perpendicular bore extending through the expansion 156 and the handle 158 situated and retained in the bore. Alternatively, the handle 158 can be two rods attached to opposite surfaces of the expansion or the handle can be formed integral with the expansion. The hexagon or nut shape of the expansion allows the user to grip and rotate the stem 130 with a wrench should the user rather use a wrench instead of the handle 158, such as to gain greater torque that can be exerted by a long pipe wrench.

The tubular body 134 is illustrated in FIGS. 8-10. The illustrated tubular body 134 can be formed of a metallic material or non-metallic materials such as plastic. The tubular body 134 defines a first opening 160 at a first end 162 and a second opening 164 at a second end 166. The tubular body 134 defines an outer surface 168 and an inner surface 170. The inner surface 170 of the tubular body has a diameter $D_5$. The tubular body 134 includes threading 172 on a section of the outer surface 168 adjacent to second end 166. A pair of windows 174 can extend through the tubular body 134 axially from the first end 162. The housing can include a ring 176 surrounding and attached to the outer surface 168 of the tubular body 134 adjacent to the first end 162. The outer surface of the ring 176 has a diameter $D_6$. The ring 176 surrounds portions of the windows 174 to provide rigidity to the tubular body 134 and increases the surface area of a generally annular surface 177 of the first end 162 of the housing 132. With the ring 176 attached to the tubular body 134, the outer diameter of the generally annular surface 177 is the outer diameter $D_6$ of the ring 176 and the inner diameter of the generally annular surface 177 is the inner diameter $D_5$ of tubular body 134. The outer diameter $D_7$ of the ring annular surface 177 is preferably smaller than the outer diameter $D_2$ of the valve body tube annular surface 120 (shown in FIG. 2) and the inner diameter inner diameter $D_5$ of the ring annular surface 177 is preferably larger than the inner diameter $D_3$ of the valve body tube annular surface 120, allowing the generally annular surface 177 to fully contact the valve body tube annular surface 120.

Figure 11:
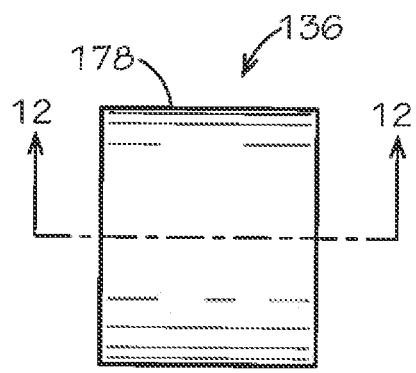
FIG. 11 is a side view of the cap illustrated in FIG. 4.
Figure 13:
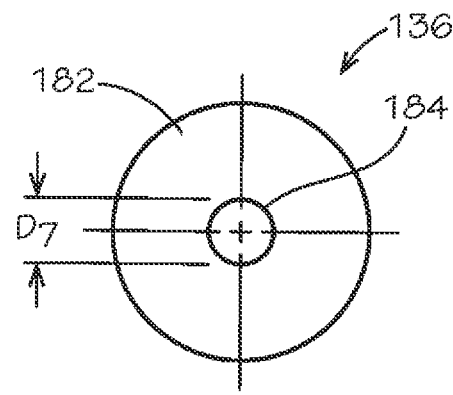
FIG. 13 is a top view of the cap illustrated in FIG. 11.
Figure 12:
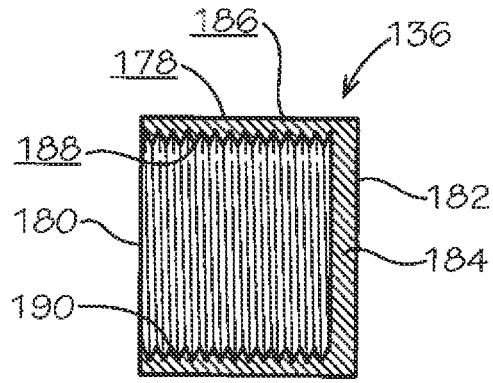
FIG. 12 is a cross-sectional view of the cap along line 12-12 as shown in FIG. 11.

The cap 136 is illustrated in FIGS. 11-13. The illustrated cap 136 can be formed of a metallic material or non-metallic materials such as plastic. The cap 136 includes a tubular body 178 with an opening 180 at one end and an annular end plate 182 at the other end. The annular plate defines a through hole 184 having a diameter $D_7$ larger than the major diameter $D_4$ of the second threaded section 154 of the stem screw 130, allowing the stem screw 130 to slide effortlessly through the through hole 184 of the cap. The tubular body 178 defines an outer surface 186 and an inner surface 188. The inner surface 188 of the cap includes threading 190 extending from the opening 180 to the end plate 182. The diameters and thread count of the threading 190 of the cap 136 match the corresponding major, minor and pitch diameters and thread count of the threading 172 of the housing 132 such that the cap 136 can be attached to the housing 134 to cover the second opening 164 of the housing.

Figure 14:
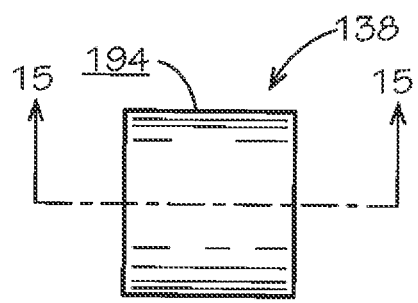
FIG. 14 is a side view of the sleeve illustrated in FIG. 4.
Figure 16:
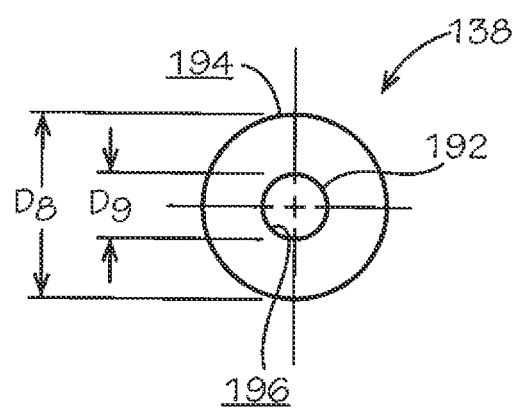
FIG. 16 is a top view of the sleeve illustrated in FIG. 14.
Figure 15:
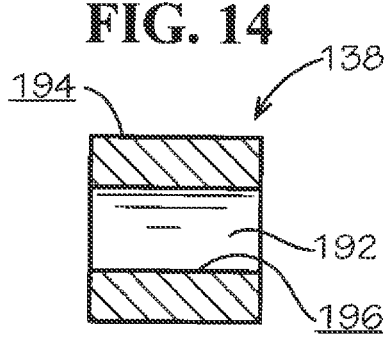
FIG. 15 is a cross-sectional view of the sleeve along line 15-15 as shown in FIG. 14.

The sleeve 138 is illustrated in FIGS. 14-16. The illustrated cap 136 can be formed of a metallic material or non-metallic materials such as plastic. The sleeve 138 is generally tubular shaped and defines a bore 192 extending axially through the centerline of the sleeve from one end of the sleeve to the other end. The sleeve 138 defines an outer surface 194 having a diameter $D_8$ and an inner surface 196 having a diameter $D_9$. The diameter $D_8$ of the outer surface 194 of the sleeve 138 is slightly smaller than the diameter $D_5$ of inner surface of the tubular body 134 of the housing 132, allowing the sleeve 138 to be inserted into the tubular body 134 through the second opening 166 of the housing and form a tight fit between the sleeve and the tubular body. The diameter $D_9$ of the inner surface 196 of the sleeve 138 or the bore 192 is larger than the major diameter $D_4$ of the second thread section 154 of the stem screw 130, allowing the stem screw 130 to slide effortlessly through the bore 192 of the sleeve.

Figure 17:
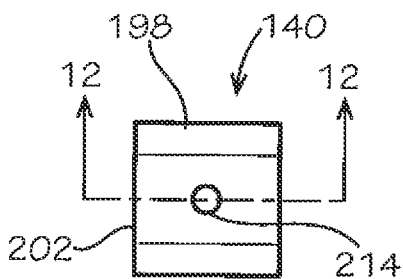
FIG. 17 is a side view of the collar illustrated in FIG. 4.
Figure 19:
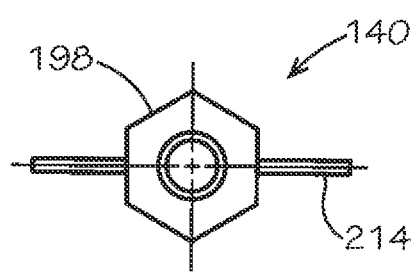
FIG. 19 is a top view of the collar illustrated in FIG. 17.
Figure 18:
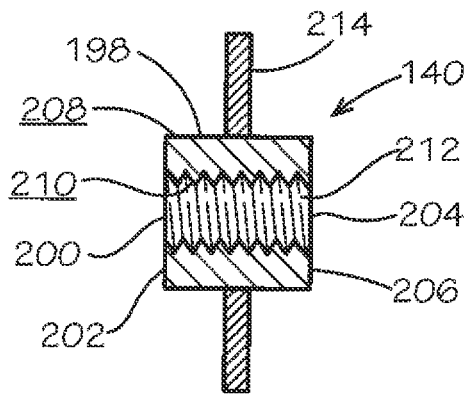
FIG. 18 is a cross-sectional view of the collar along line 18-18 as shown in FIG. 17.

The collar 140 is illustrated in FIGS. 17-19. The illustrated collar 140 can be formed of a metallic material or non-metallic materials such as plastic. The collar 140 includes a hexagon or nut shaped body 198 with a first opening 200 at a first end 202 and a second opening 204 at a second end 206. The collar body 198 defines an outer surface 208 and an inner surface 210. The inner surface 210 of the collar body includes threading 212 extending from the first opening 200 to the second opening 204. The diameters and thread count of the threading 212 of the collar 140 match the corresponding major, minor and pitch diameters and thread count of the threading of the second threaded section 154 of the stem screw 130 such that the collar 140 can be attached to and rotate on second threaded section 154. The collar includes a handle 214 extending perpendicularly and radially from the collar body 196. FIGS. 18 and 19 illustrate two rods attached to opposite surfaces of the collar body 198 to form the handle 214. Alternatively, the handle 214 can be formed internal with the collar body 198. The hexagon or nut shape of the outer surface 208 of the collar body 198 allows the user to grip and rotate the collar 140 with a wrench should the user rather use a wrench instead of the handle 214, such as to gain greater torque that can be exerted by a long pipe wrench.

Figure 21:
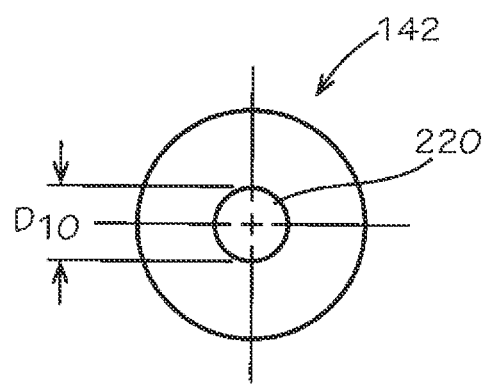
FIG. 21 is a top view of the washer illustrated in FIG. 20.
Figure 20:
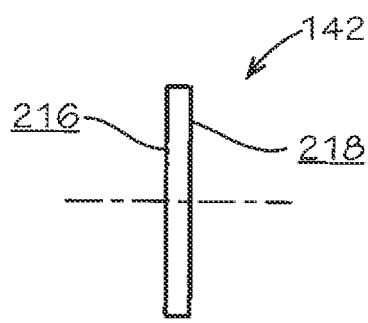
FIG. 20 is a side view of the washer illustrated in FIG. 4.

The washer 142 is illustrated in FIGS. 20 and 21. The illustrated collar 140 can be formed of a metallic material or non-metallic materials such as plastic. The washer 142 is annular shaped with a first annular surface 216, a second annular surface 218 and a through hole 220 having a diameter $D_{10}$ larger than the major diameter $D_4$ of the second threaded section 154 of the stem screw 130, allowing the stem screw 130 to slide effortlessly through the through hole 220 of the washer.

Figure 22:
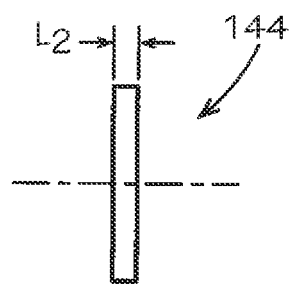
FIG. 22 is a side view of the centering annular flange illustrated in FIG. 4.
Figure 23:
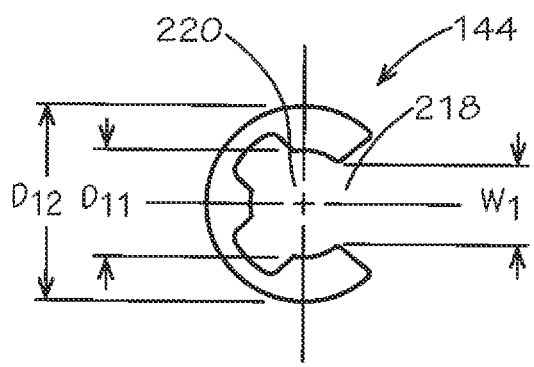
FIG. 23 is a top view of the centering annular flange illustrated in FIG. 4.

The centering flange 144 is illustrated in FIGS. 22 and 23. The illustrated centering flange 144 can be formed of a metallic material or non-metallic materials such as plastic. The centering flange 144 can be an E-clip as illustrated in FIGS. 23 and 23, Alternatively, the centering flange can be C-clip (not shown) or formed integral to the stem screw 130. The centering flange 144, illustrated in FIGS. 22 and 23 in the shape of an E-clip, has a slot 218 having a width $W_1$ that is slightly smaller than the diameter $D_3$ of the stem screw groove 152 and an inner opening 220 having a diameter $D_{11}$ that is larger than the diameter $D_3$ of the stem screw groove 152. Also as illustrated in FIG. 22, the centering flange 144 has an axial length or thickness $L_2$ that is less than the axial length $L_1$ of the stem screw groove 152. The thickness of the centering flange 144 and the size of the slot 218 and opening 220 allow the stem screw 130 to slide through the slot 218 upon expansion the centering flange 144 and the centering flange 144 to spring back to its original shape such that the centering flange 144 surrounds that the stem screw groove 152 and be retained to the stem screw 130. Upon the centering flange 144 retained to the stem screw 130, the centering flange is generally perpendicular to the axis of the stem screw 130. The centering flange 144 has an outer diameter $D_{12}$ slightly smaller than the diameter $D_5$ of the inner surface 170 of the tubular body 134, allowing the centering flange 144 to slide effortlessly in the housing 132 while maintaining the stem screw 130 approximately along the axis of the cartridge pulling tool 110.

Referring back to FIGS. 3 and 4, the steps for assembling the cartridge pulling tool can be as follows. The end 146 of the stem screw 130 can be inserted into the second opening 204 of the collar 140 until the threading 212 of the collar contacts the threading of the second threaded section 154 of the stem screw 130. The collar 140 is then rotated so as move axially along the second threaded section 154 towards the expansion 156 and handle 158. Upon the collar moved sufficiently axially along the second threaded section 154, the end 146 of the stem screw 130 is inserted into the through hole 220 of the washer 142 until the second annular surface 218 of the washer is adjacent to the collar 140. Separately, the sleeve 138 is inserted into the housing 132 through the second opening 164 of the housing until the sleeve 138 is fully situated within the tubular body 134. Once the sleeve 138 is fully within the tubular body 134, the threading 190 of the cap 136 are engaged with the threading 172 of the housing 132 to secure the cap 136 to the housing to block the second opening 164 of the housing 132 and retain the sleeve 138 within the housing. With the sleeve 138 situated within the housing 132 and the cap 136 secured to the housing, the end 146 of the stem screw 130 can be inserted into the through hole 184 of the cap and the bore 192 of the sleeve until the annular end plate 182 of the cap is adjacent to the first annular surface 216 of the washer. With the groove 152 of the stem screw located axially outward of the first end 162 of the housing, such that the groove 152 is exposed, the centering flange 144 is attached to the stem screw 130 by fitting the slot 220 of the centering flange 144 to the groove 152 and pressing the centering flange 144 radially inward until the groove 152 of the stem screw 130 is located in the opening 224 of the centering flange.

Referring back to FIG. 2, the steps for pulling a cartridge out of a faucet valve body using the cartridge pulling tool 110 can be as follows. The stem screw 130 is axially aligned with the stem 124 of the cartridge 112. The end 146 of the stem screw 130 can then be inserted into the hollow interior 128 of the cartridge stem 124 until the first threaded section 148 of the stem screw is in contact with the internal threading 126 of the cartridge stem 124. The stem screw 130 can then be rotated by using the handle 158 or a pipe wrench clamped to the hexagon shaped expansion 156. As the stem screw 130 is rotated, the engagement of the threading of the first threaded section 148 with the threading of internal threading 126 of the cartridge stem causes the first threaded section 148 to move axially inward of the cartridge stem 124 until the conical section 150 of the stem screw engages the cartridge stem 124. The generally annular surface 177 of the first end 162 of the housing 132 is then positioned adjacent to the annular surface of the valve body tube 116. The collar 138 can then be rotated such that engagement of the threading 212 of the collar with the threading of the second threaded section 154 of the stem screw causes the collar to move axially along the stem screw 130 toward the housing 132. Once the first end 202 of the collar engages the second annular surface 218 of the washer 142 and the first annular surface 216 of the washer engages the annular end plate 182 of the cap, further rotation of the collar 140 causes the collar 140 to apply a force against the annular end plate 184 causing the first threaded section 148 to move axially inward into the housing 132 in the direction of arrow 226 towards the second end 166 of the housing. As the collar 140 is rotated; the first thread section 148, attached to the cartridge stem 124, is moved axially away from the hollow interior 118 of the valve body tube 118 and pulls the cartridge 112 out of the valve body tube 118. The collar 140 can be rotated until the cartridge 112 has been pulled out of the valve body tube 118. Once the cartridge 112 has been pulled out of the valve body 118, the cartridge 112 can be separated from the cartridge pulling tool 110 by rotating the cartridge 112 relative to the stem screw 130 until the threading of the first threaded section 148 of the stem screw has been disengaged from the internal threading 126 of the cartridge stem 124.

A second aspect of a cartridge pulling tool 310 is disclosed and described in FIGS. 24-25. As shown in FIGS. 24 and 25, the cartridge pulling tool 310 of the second aspect can comprise a stem screw 330, a housing 332 that includes a tubular body 334, a collar 340, and a washer 142. The washer 142 of the second aspect of the pulling tool 310 can be the same as the washer 142 of the first aspect of the pull tool 110.

The stem screw 330 of the second aspect is similar to the stem screw 130 of the first aspect with the exception that a handle is attached directly to the end of the second threaded section of the stem screw 330 and the stem screw 330 does not define a groove to accommodate a centering annular flange. The stem screw 330 includes a rounded or tapered end 346, a first threaded section 348, a conical section 350, a second threaded section 354, and a perpendicularly or radially extending handle 358 at the other end of the stem screw. The first threaded section 348 of the stem screw has major, minor and pitch diameters and thread count to match the corresponding diameters and thread count of the internal threading 126 of the cartridge stem 124 (as shown in FIG. 2) such that the first threaded section 348 of the stem screw 330 is able to engage and be securely attached to the cartridge stem 124. The rounded or tapered end 346 of the stem screw 330 assists in guiding the first threaded section 348 of the stem screw 330 into the hollow interior 126 of the cartridge stem 124. The conical section 350 of the stem screw transitions the stem screw from the first threaded section 348 to the second threaded section 354. The conical section 350 can also act as a stop to prevent further axial insertion of the stem screw 330 into the cartridge stem 124. The handle 358 can be formed with the second threaded section 354 or the handle 358 can be formed separately and then attached to the second threaded section 354 such as by welding.

The housing 332 of the second aspect is similar to the housing 132 of the first aspect with the exception that an annular end plate is at the second end of the housing 332 and the housing 332 does not include a cap or a sleeve. The housing 332 includes a tubular body 334 with a first opening 360 at a first end 362 and an annular end plate 382 at a second end 366. The annular plate defines a through hole 384, which the stem screw 330 is able to slide effortlessly through. The tubular body 334 defines an outer surface 368 and an inner surface 370. A pair of windows 374 can extend through the tubular body 334 axially from the first end 362. The housing can include a ring 376 surrounding and attached to the outer surface 368 of the tubular body 334 adjacent to the first end 362. The ring 376 surrounds portions of the windows 374 to provide rigidity to the tubular body 334 and increases the surface area of a generally annular surface 377 of the first end 362 of the housing 332.

The collar 340 of the second aspect is similar to the collar 140 of the first aspect with the exception that the housing 340 does not include a handle. The collar 340 includes a hexagon or nut shaped body 398. The collar body 398 defines an outer surface 408 and an inner surface 410. The inner surface of the collar body includes threading 412. The diameters and thread count of the threading 412 of the collar 340 match the corresponding major, minor and pitch diameters and thread count of the threading of the second threaded section 354 of the stem screw 330 such that the collar 340 can be attached to and rotate on second threaded section 354. The hexagon or nut shape of the outer surface 408 of the collar body 398 allows the user to grip and rotate the collar 340 with a wrench.

The steps for assembling the cartridge pulling tool 310 of the second aspect can be as follows. The end 346 of the stem screw 330 can be inserted into the opening of the collar 340 until the threading 412 of the collar contacts the threading of the second threaded section 354 of the stem screw 330. The collar 340 is then rotated so as move axially along the second threaded section 354 towards the handle 358. Upon the collar moved sufficiently axially along the second threaded section 354, the end 346 of the stem screw 330 is inserted into the through hole of the washer 142 until the washer is adjacent to the collar 340. The end 346 of the stem screw 330 can then be inserted into the through hole 384 of housing until the annular end plate 382 of the housing is adjacent to the washer 142.

The final drawing in FIG. 26 shows an additional puller extension 520 which is necessary to use in pulling a sleeve 500 of a Moen cartridge No. 1200 which is difficult to remove with a standard stem 24 previously discussed. The special puller extension 520 has a spring-loaded nipple 530 so when the extension 520 is inserted into the Moen 1200 sleeve the nipple locks into the aperture 510. In this position when the core pulling tool previously discussed is inserted into the threaded stem 540 of the special extension puller 520 the Moen 1200 sleeve 500 can be removed more easily.

The steps for pulling a cartridge out of a faucet valve body using the cartridge pulling tool 310 of the second aspect is similar to the steps for pulling a cartridge out of a faucet valve body using the cartridge pulling tool 110 of the first aspect. The stem screw 330 is axially aligned with the stem 124 of the cartridge 112 (shown in FIG. 2). The end 346 of the stem screw 330 can then be inserted into the hollow interior 128 of the cartridge stem 124 until the first threaded section 348 of the stem screw is in contact with the internal threading 126 of the cartridge stem 124. The stem screw 330 can then be rotated by using the handle 358. As the stem screw 330 is rotated, the engagement of the threading of the first threaded section 348 with the threading of internal threading 126 of the cartridge stem causes the first threaded section 348 to move axially inward of the cartridge stem 124 until the conical section 350 of the stem screw engages the cartridge stem 124. The generally annular surface 377 of the first end 362 of the housing 332 is then positioned adjacent to the annular surface of the valve body tube 116 (shown in FIG. 2). The collar 338 can then be rotated such that engagement of the threading 412 of the collar with the threading of the second threaded section 354 of the stem screw causes the collar to move axially along the stem screw 330 toward the housing 332. Once the collar 338 engages the washer 342 and the washer engages the annular end plate 382 of the housing, further rotation of the collar 340 causes the collar 340 to apply a force against the annular end plate 382 causing the first threaded section 348 to move axially inward into the housing 332 towards the second end 366 of the housing. As the collar 340 is rotated; the first thread section 348, attached to the cartridge stem 324, is moved axially away from the hollow interior 318 of the valve body tube 318 and pulls the cartridge 112 out of the valve body tube 118. The collar 340 can be rotated until the cartridge 312 has been pulled out of the valve body tube 318. Once the cartridge 112 has been pulled out of the valve body 118, the cartridge 112 can be separated from the cartridge pulling tool 310 by rotating the cartridge 112 relative to the stem screw 330 until the threading of the first threaded section 348 of the stem screw has been disengaged from the internal threading 126 of the cartridge stem 124.

One should note that conditional language, such as, among others, "can," "could," "might," or "may," unless specifically stated otherwise, or otherwise understood within the context as used, is generally intended to convey that certain aspects include, while other aspects do not include, certain features, elements anchor steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

It should be emphasized that the above-described aspects are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described aspect(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A faucet valve cartridge pulling tool comprising:
   a tubular housing having a first end and a second end, the first end having a surface adapted to abut a portion of a faucet valve body;
   a stem screw having a first end and a second end, the stem screw including a first threaded section and a second threaded section, the first threaded section adapted to engage internal threading of a faucet valve cartridge stem located within the faucet valve body;
   a collar having internal threading engaging the second threaded section of the stem screw, wherein rotating the collar relative to the stem screw pulls the first threaded portion axially towards the second end of the housing; and
   a flange extending radially outward from the second threaded section of the stem screw, the flange having an outer diameter less than a diameter of an inner surface of the tubular body.

2. The faucet valve cartridge pulling tool of claim 1 wherein the housing further having an annular end plate at the second end, the annular end plate defining a hole, the stem screw located in the hole of the annular end plate.

3. The faucet valve cartridge pulling tool of claim 2 wherein the collar applies a force against the annular end plate of the housing upon rotating the collar relative to the stem screw.

4. The faucet valve cartridge pulling tool of claim 1 wherein the stem screw further having a handle extending radially outward.

5. The faucet valve cartridge pulling tool of claim 1 wherein the stem screw further having a hexagon shaped expansion at the second end.

6. The faucet valve cartridge pulling tool of claim 1 wherein the collar further having a handle extending radially outward.

7. The faucet valve cartridge pulling tool of claim 1 wherein the collar having a hexagon shaped outer surface.

8. The faucet valve cartridge pulling tool of claim 1 wherein the tubular body includes a window.

9. The faucet valve cartridge pulling tool of claim 1 wherein the housing further having a sleeve radially inward of the tubular body, the sleeve defining a bore extending axially through the sleeve, the stem screw located in the bore of the sleeve.

10. The faucet valve cartridge pulling tool of claim 1 wherein the stem screw defines a groove, the flange situated radially outward of the groove.

11. The faucet valve cartridge pulling tool of claim 10 wherein the flange is an E-clip.

12. The faucet valve cartridge pulling tool of claim 1 wherein the housing further having a cap attached to the tubular body.

13. The faucet valve cartridge pulling tool of claim 12 wherein the cap includes internal threading for attaching the cap to the tubular body.

14. The faucet valve cartridge pulling tool of claim 1 further comprising a washer axially between the housing and the collar.

15. The faucet valve cartridge pulling tool of claim 1 wherein the stem screw further includes a conical section between the first threaded section and the second threaded section.

16. A method for pulling a faucet valve cartridge comprising the steps of:
   providing a housing having a first end and a second end, the first end having a surface;
   providing a stem screw having a first end a second end, the stem screw includes a first threaded section and a second threaded section;
   providing a collar having internal threading engaging the second threaded section of the stem screw;
   positioning the first end of stem screw in an opening of a cartridge stem located within a faucet valve body tube having a surface;
   rotating the stem screw to insert the first threaded section of the stem screw within the cartridge stem;
   positioning the surface of the housing in abutting relationship with the surface of the faucet valve body tube; and
   rotating the collarrelative to the stems crew to pull the cartridge stem towards the second end of the housing;
   wherein the housing further having an annular plate at the second end, the step of rotating the collar relative to the stem causes the collar to apply a force against the annular plate and the stem screw further having a conical section between the first threaded section and the second threaded section, the step of rotating the stem screw to insert the first threaded section of the stem screw within the cartridge stem continues until the cartridge stem contacts the conical section of the stem screw.

* * * * *